United States Patent Office — 3,032,566 — Patented May 1, 1962

3,032,566
12-HALOGENATED - 16 - HYDROXYLATED PREGNENES AND METHOD OF PREPARING THE SAME
Ruddy Littell, River Vale, N.J., and Seymour Bernstein, Pearl River, N.Y., assignors to American Cyanamid Company, New York, N.Y., a corporation of Maine
No Drawing. Filed June 21, 1957, Ser. No. 667,281
8 Claims. (Cl. 260—397.45)

This invention relates to 12α-halo-16α,17α,21-trihydroxy-4-pregnene-3,11,20-triones and the 16α,21-esters thereof and methods of preparing the same.

It is known in the past that 9α-halogenation of steroids of the pregnane series produces increased glucocorticoid activity, particularly of those compounds having an oxygen function at the C-11-position. Subsequently, it has been found that a halogen at the C-12-position results in a similar enhancement of activity. These compounds cannot be used systemically for arthritis and related disorders because of sodium retention. The compounds of the present invention, however, containing a C-12 halogen and a hydroxyl group at C-16 do not cause sodium retention and can be used systemically.

The compounds of the present invention can be illustrated by the following general formula:

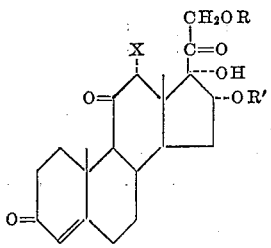

in which R and R' are hydrogen and lower alkanoyl radicals and X is halogen.

The compounds of the present invention are solids which have relatively high melting points. They are soluble in the usual organic solvents and relatively insoluble in water.

The present compounds are prepared from starting material such as, for example, 21-acetoxy-12α-bromo-4,16-pregnadiene-3,11,20-trione, described by McGuckin et al., J. Am. Chem. Soc. 77, page 1822 (1955). These intermediates containing the 16-17 double bond are oxidized in the presence of water and an organic solvent to produce the corresponding 16α,17α-dihydroxy derivatives. The oxidation is carried out using mild oxidizing agents such as osmic acid, dilute solution of potassium permanganate, and the like. The organic solvents can be, for example, pyridine, benzene, acetone, etc., depending somewhat on the oxidizing agent used. The reaction will take place at room temperature or below, usually at a temperature of from 0° to 35° C. Following completion of the reaction, the product can be purified by partition chromatography, crystallization, or similar means.

The compounds of the present invention can be used in the form of pharmaceutical preparations, such as capsules, pills, tablets, solutions for injection, ointments, salves, and the like. In addition the compounds of the present invention may serve as intermediates or other active corticoids by simple dehalogenation, as shown hereinafter in the examples.

The following examples describe in detail the preparation of representative compounds of the present invention.

*Example 1*

To a solution of 21-acetoxy-12α-bromo-4,16-pregnadiene-3,11,20-trione, 926 mg. in 25 ml. of benzene containing 0.4 ml. of pyridine, is added 575 mg. of osmic acid in 10 ml. of benzene. The mixture is stirred at room temperature for seven hours, after which a solution of 3.8 g. of sodium sulfite anhydrous, 3.8 g. of potassium bicarbonate in 40 ml. of water, and 25 ml. of methyl alcohol is added. This mixture is stirred at room temperature for 18 hours, filtered, and washed with ethyl acetate. The filtrate is washed with saturated saline, treated with sodium sulfate anhydrous and activated carbon, filtered through diatomaceous earth, and evaporated to 400 mg. of white glass under reduced pressure. The glass is acetylated overnight with 1 ml. of acetic anhydride in pyridine at room temperature. After the addition of methyl alcohol, the reaction mixture is evaporated to dryness under reduced pressure, extracted with ethyl acetate, washed with saturated saline, treated with magnesium sulfate anhydrous and activated carbon, filtered through diatomaceous earth, and evaporated to dryness under reduced pressure to give a white glass.

Purification is accomplished by partition chromatography on diatomaceous earth, using a petroleum ether, methylene chloride, ethylene glycol (10:3:1) system, and followed by a recording spectrophotometer at 238 mμ. The second hold back volume on concentration gives 83 mg. of crystals of 16α,21-diacetoxy-17α-hydroxy-12α-bromo-4-pregnene-3,11,20-trione, melting point 225–227° C. Three crystallizations from acetone-petroleum ether give 50 mg., melting point 228–229° C., $\lambda_{max.}^{Abs. alc.}$ 237 mμ 13,700

$[\alpha]_D^{24}$ +26°, (c. 0.995 in chloroform). Infrared spectral analysis shows this product to be identical with that obtained from the potassium permanganate hydroxylation.

*Example 2*

To a solution of 21-acetoxy-12α-bromo-4,16-pregnadiene-3,11,20-trione (926 mg.) in 40 ml. of acetone is added a solution of potassium permanganate (320 mg.) in 25 ml. of 85% aqueous acetone at 0° C., and the mixture is stirred at 0° C. for seven minutes. Cold saturated sodium bisulfite is added, and the brown inorganic precipitate is filtered through diatomaceous earth. The clear, colorless filtrate is evaporated under reduced pressure to a small volume, the solution is cooled, and 440 mg. of white solid filtered, melting point 200–205° C. Paper strip chromatographic analysis shows appreciable amounts of five blue tetrazolium reducing products. Crystallization of this material from acetone-petroleum ether gives 88 mg., melting point 250° C. Two further crystallizations from acetone give 20 mg. of white powder, 21-acetoxy-16α,17α-dihydroxy-12α-bromo-4-pregnene-3,11,20-trione, melting at 263° C., $[\alpha]_D$ +39° (pyridine).

*Analysis.*—Calcd. for $C_{23}H_{29}O_7Br$ (497.38): C, 55.54; H, 5.88; Br, 16.07. Found: C, 55.85; H, 5.95; Br, 16.21.

Chromatography of the mother liquors on silica gel gives 100 mg. of pure starting material.

*Example 3*

The reaction of Example 2 is repeated (1.4 g.) with the addition of 0.35 ml. of acetic acid, and there is obtained 180 mg. of the above product, melting point 261° C., $\lambda_{max.}^{Methanol}$ 237 mμ ε16,400

*Example 4*

To a solution of 21-acetoxy-16α,17α-dihydroxy-12α-bromo-4-pregnene-3,11,20-trione (155 mg.) in 6 ml. of pyridine is added 0.6 ml. of acetic anhydride. After standing at room temperature for 20 hours, the mixture is poured into water, cooled, and 135 mg. of white powder is filtered, melting point 219–221° C. Crystallization from acetone-petroleum ether gives 105 mg. of 16α,21-diacetoxy-17α-hydroxy-12α-bromo - 4 - pregnene-3,11,20-trione, melting point 228°–229° C. One crystallization of a 35 mg. portion from acetone-petroleum ether gives 32 mg., melting point 228°–229° C.

*Example 5*

The compound 21-acetoxy-16α,17α-dihydroxy-12α-bromo-4-pregnene-3,11,20-trione on hydrolysis with acid gives 16α,17α,21-trihydroxy-12α-bromo-4-pregnene-3,11,20-trione.

*Example 6*

To a solution of 16α,21-diacetoxy-17α-hydroxy-12α-bromo-4-pregnene-3,11,20-trione (54 mg.) in 4 to 6 ml. of glacial acetic acid is added 60 mg. of zinc dust, the mixture is stirred at 15–20° C. for 20 minutes, filtered through diatomaceous earth, and the residue washed with several portions of ethanol. The combined filtrates are evaporated to dryness under reduced pressure at no greater than 40° C. They are extracted with ethyl acetate, washed once with saturated sodium bicarbonate, and twice with saturated saline. The extract is treated with magnesium sulfate anhydrous, filtered through diatomaceous earth, and evaporated to dryness under reduced pressure to give a white powder. Paper strip chromatographic analysis shows complete absence of starting material and only a homogenous spot having polarity identical with an authentic sample. A single crystallization from acetone-petroleum ether gives 36 mg. of 16α,21-diacetoxy-17α-hydroxy-4-pregnene-3,11,20-trione, melting point 233–234° C. Infrared analysis shows identity with an authentic sample.

We claim:

1. Compounds having the general formula:

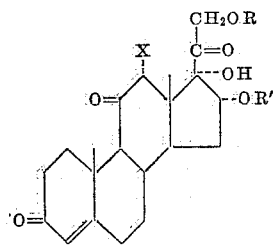

in which R and R' are members of the group consisting of hydrogen and lower alkanoyl radicals and X is bromo.

2. The compound 16α,21-diacetoxy-17α-hydroxy-12α-bromo-4-pregnene-3,11,20-trione.

3. The compound 21-acetoxy-16α,17α-dihydroxy-12α-bromo-4-pregnene-3,11,20-trione.

4. The compound 16α,17α,21-trihydroxy-12α-bromo-4-pregnene-3,11,20-trione.

5. A method of preparing a 21-lower alkanoyloxy-16α,17α-dihydroxy-12α-bromo-4-pregnene-3,11,20-trione which comprises reacting a 21-lower alkanoyloxy-12α-bromo-4,16-pregnadiene-3,11,20-trione with a mild oxidizing agent in the presence of water and an organic solvent.

6. A method of preparing 21-acetoxy-16α,17α-dihydroxy-12α-bromo-4-pregnene-3,11,20-trione which comprises reacting 21-acetoxy-12α-bromo-4,16-pregnadiene-3,11,20-trione with potassium permanganate in the presence of water and an organic solvent.

7. A method of preparing 16α,21-diacetoxy-17α-hydroxy-12α-bromo-4-pregnene-3,11,20-trione which comprises reacting 21-acetoxy-12α-bromo-4,16-pregnadiene-3,11,20-trione with potassium permanganate in the presence of water and an organic solvent and subsequently with acetic anhydride.

8. Compounds having the general formula

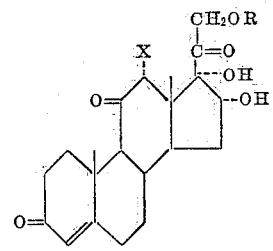

in which R represents a lower alkanoyl radical and X represents a bromine atom.

References Cited in the file of this patent
UNITED STATES PATENTS

| | | |
|---|---|---|
| 2,777,864 | Bernstein et al. | Jan. 15, 1957 |
| 2,813,109 | Colton et al. | Nov. 12, 1957 |
| 2,979,517 | Herzog | Apr. 11, 1961 |